United States Patent
Igarashi

(10) Patent No.: US 10,023,192 B2
(45) Date of Patent: Jul. 17, 2018

(54) VIBRATION CONTROL DEVICE AND VIBRATION CONTROL SYSTEM

(71) Applicant: TOYOTA JIDOSHA KABUSHIKI KAISHA, Toyota-shi, Aichi-ken (JP)

(72) Inventor: Masashi Igarashi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 19 days.

(21) Appl. No.: 15/068,771

(22) Filed: Mar. 14, 2016

(65) Prior Publication Data

US 2016/0272211 A1 Sep. 22, 2016

(30) Foreign Application Priority Data

Mar. 21, 2015 (JP) .................................. 2015-058826

(51) Int. Cl.
 *B60W 30/18* (2012.01)
 *B60W 30/02* (2012.01)

(52) U.S. Cl.
 CPC .... *B60W 30/18145* (2013.01); *B60W 30/025* (2013.01); *B60W 2520/16* (2013.01); *B60W 2540/18* (2013.01); *B60W 2720/30* (2013.01)

(58) Field of Classification Search
 CPC .......... B60W 30/025; B60W 2720/30; B60W 2540/18; B60W 2520/16; B60W 10/04; B60W 30/045; B60W 2510/20; B60W 30/18145
 USPC ...................... 701/38, 36, 65, 69, 72, 90, 91
 See application file for complete search history.

(56) References Cited

U.S. PATENT DOCUMENTS

| 5,531,110 A | 7/1996 | Ohashi et al. |
| 2005/0049761 A1 | 3/2005 | Kataoka et al. |
| 2005/0200088 A1* | 9/2005 | Sawada ................. B60W 10/04 280/5.507 |
| 2006/0052908 A1 | 3/2006 | Matsumoto et al. |
| 2013/0030648 A1 | 1/2013 | Matsumoto et al. |
| 2016/0059885 A1* | 3/2016 | Tsubaki ............... B62D 5/0472 701/42 |

FOREIGN PATENT DOCUMENTS

| EP | 2 816 211 A1 | 12/2014 |
| JP | 2004-168148 A | 6/2004 |

(Continued)

OTHER PUBLICATIONS

Partial Translation of Communication dated Feb. 17, 2017, issued by the Taiwanese Intellectual Property Office in corresponding Taiwanese Application No. 105108269.

*Primary Examiner* — Nga X Nguyen
(74) *Attorney, Agent, or Firm* — Sughrue Mion, PLLC

(57) ABSTRACT

A vibration damping control device that controls drive output of a vehicle so as to suppress pitch/bounce vibration of the vehicle includes a vibration damping control unit that controls driving torque of the vehicle so as to reduce an amplitude of the pitch/bounce vibration, based on wheel torque applied to wheels of the vehicle and generated at a location where the wheels contact with a road surface, and a compensation component adjusting unit that reduces an amplitude of a compensation component that corrects the wheel torque calculated by the vibration damping control unit so as to suppress the pitch/bounce vibration, as the magnitude of the steering angle velocity of the vehicle increases.

4 Claims, 4 Drawing Sheets

(56) References Cited

FOREIGN PATENT DOCUMENTS

| | | |
|---|---|---|
| JP | 2006-69472 A | 3/2006 |
| JP | 2008-105471 A | 5/2008 |
| JP | 2008-105472 A | 5/2008 |
| JP | 2009-40163 A | 2/2009 |
| JP | 2013231403 A | 11/2013 |
| JP | 2014013006 A | 1/2014 |
| TW | 269003 B | 1/1996 |
| TW | M261268 U | 4/2005 |
| TW | I314114 B | 9/2009 |
| WO | 2014175052 A1 | 10/2014 |
| WO | 2015/091051 A1 | 6/2015 |

\* cited by examiner

VIBRATION CONTROL DEVICE AND VIBRATION CONTROL SYSTEM

INCORPORATION BY REFERENCE

The disclosure of Japanese Patent Application No. 2015-058826 filed on Mar. 21, 2015 including the specification, drawings and abstract is incorporated herein by reference in its entirety.

BACKGROUND OF THE INVENTION

1. Field of the Invention

The invention relates to a vibration damping control device of a vehicle, such as an automobile. More specifically, the invention is concerned with a vibration damping control device that suppresses vibration of a vehicle body by controlling drive output (driving force or driving torque) of the vehicle having an engine as a drive unit.

2. Description of Related Art

Vibrations, such as pitch and bounce vibrations, during traveling of the vehicle are generated due to braking or driving force (or inertial force) that acts on the vehicle body during acceleration or deceleration of the vehicle, or other external force that acts on the vehicle body. At this time, these forces are reflected by "wheel torque" (torque applied between wheels and a road surface with which the wheels contact) which is applied by the wheels (drive wheels when the vehicle is driven) to the road surface. Thus, in the field of vehicular vibration damping control, it has been proposed to adjust the wheel torque through drive output control of an engine or other drive unit of the vehicle, so as to suppress vibration of the vehicle body during traveling of the vehicle (see, for example, Japanese Patent Application Publication No. 2004-168148 (JP 2004-168148 A), Japanese Patent Application Publication No. 2006-69472 (JP 2006-69472 A), Japanese Patent Application Publication No. 2008-105471 (JP 2008-105471 A), Japanese Patent Application Publication No. 2008-105472 (JP 2008-105472 A), and Japanese Patent Application Publication No. 2009-40163 (JP 2009-40163 A)). In vibration damping control using drive output control as described above, pitch/bounce vibration that arises in the vehicle body when a vehicle acceleration/deceleration request is made or when external force (disturbance) acts on the vehicle body and causes fluctuations in the wheel torque is predicted, using a motion model constructed based on a dynamic model of so-called sprung-mass vibration or sprung-mass and unsprung-mass vibration of the vehicle body, and the drive output of the drive unit of the vehicle is adjusted so as to suppress the predicted vibration. The vibration damping control of this type is advantageous in that the vibration damping operation is relatively quickly performed, and the energy efficiency is good. This is because generation of vibrational energy can be curbed or suppressed by adjusting the source of force that generates vibration, rather than suppressing generated vibrational energy by absorbing the same through vibration damping control using suspensions, for example. Also, in the vibration damping control as described above, an object to be controlled is limited to wheel torque or braking or driving force of the wheel; therefore, the control can be relatively easily adjusted.

In the meantime, during turning of the vehicle, cornering force, cornering drag, etc., act on a tire of each wheel. Also, the wheel torque changes because of change of the grounding or road-contact load under centrifugal force during turning. Therefore, it is preferable to adjust wheel torque input that is fed back in the vibration damping control through the drive output control as described above, in a manner different from the time when the vehicle travels straight. More specifically, if a steering angle is given to a tire during turning of the vehicle, a cornering drag is generated in a direction opposite to the traveling direction of the vehicle, and the sum of components of the cornering drag and the cornering force in the rotational direction of the wheel (rolling resistance) arises in a direction opposite to the rotational direction. The resulting force is applied in such a direction as to reduce the wheel torque so as to reduce rotation of the wheel. Thus, in JP 2008-105471 A, it has been proposed to increase a control amount for the vibration damping control, so as to make up for reduction of the wheel torque, during turning of the vehicle. On the other hand, if the wheel torque starts changing in the decreasing direction at the start of turning of the vehicle, and the drive torque is increased so as to increase the wheel torque under vibration damping control, in response to the reduction of the wheel torque, the drive torque rapidly increases if the steering angle changes rapidly, and the vehicle turns quickly. As a result, the driver may get a feeling of insecurity. Thus, in JP 2008-105472 A, it has been proposed to stop driving force control based on wheel torque, when the steering angle velocity is larger than a predetermined value.

The motion of a vehicle in a situation where the vehicle turns during execution of vibration damping control for suppressing vibration of the vehicle body by controlling drive output will be described in more detail. Initially, in general, when the driver operates the steering wheel, and the vehicle starts turning, the rolling resistance increases in each wheel (turning resistance), as described above. As a result, nose-down of the vehicle body takes place. Then, the grounding load of the front wheels increase due to the nose-down. As a result, the cornering force increases, and the yaw moment increases, so that the yaw rate effectively appears or increases. However, if the vibration damping control is being performed during steering at the start of turning of the vehicle, the effect of the control functions to eliminate the nose-down, whereby the grounding load of the front wheels is reduced, as compared with the case where the vibration damping control is not performed. As a result, the yaw moment is reduced, and the response of the yaw rate (the rapidness of the increase) is deteriorated. The deterioration of the response of the yaw rate may make the driver feel strange or uncomfortable. Meanwhile, even if the vibration damping control is completely stopped during steering operation, as in JP 2008-105472 A, the driver may feel strange or uncomfortable. This is because the effect of the vibration damping control is suddenly eliminated, or the response of the yaw rate is rapidly changed. In this connection, similar phenomena may also occur when the steering angle is returned to 0 during turning of the vehicle.

SUMMARY OF THE INVENTION

This invention provides a vibration control device and a vibration control system which perform vibration damping control for suppressing vibration of a vehicle body by controlling wheel torque through drive output control, while curbing deterioration of the response of the yaw rate due to execution of the vibration damping control during turning of the vehicle, so that the driver is less or least likely to feel strange or uncomfortable.

A vibration damping control device that controls drive output of a vehicle so as to suppress pitch/bounce vibration caused by pitch or bounce of the vehicle, according to a first aspect of the invention, includes: a vibration damping control unit that controls driving torque of the vehicle so as to reduce an amplitude of the pitch/bounce vibration, based on wheel torque applied to wheels of the vehicle and generated at a location where the wheels contact with a road surface, and a compensation component adjusting unit that reduces an amplitude of a compensation component that corrects the wheel torque calculated by the vibration damping control unit so as to suppress the pitch/bounce vibration, as a magnitude of a steering angle velocity of the vehicle increases. Here the "wheel torque" may be a detected value of torque that is actually generated at wheels, or may be an estimated value of wheel torque estimated from the wheel speeds of the wheels. The "compensation component" is a control quantity that is given to the drive output control unit under vibration damping control, for adjusting the "wheel torque" so as to reduce the amplitude of pitch or bounce vibration.

As in the cases of vibration damping control devices described in JP 2004-168148 A, JP 2006-69472 A, JP 2008-105471 A, JP 2008-105472 A, and JP 2009-40163 A, the vibration damping control device of this invention is basically configured to control drive output so as to change the wheel torque in such a direction as to cancel out or suppress pitch or bounce vibration of the vehicle body. With the device thus configured, while the steering angle of wheels of the vehicle is changing, namely, while a significant steering angle velocity is being generated, the magnitude of the compensation component is reduced as the magnitude of the steering angle velocity increases. With this arrangement, while the steering angle of the wheels is changing (in such a direction as to increase its magnitude), namely, while the yaw moment is increasing in the vehicle, and the turning direction of the vehicle is changing, the effect of vibration damping control for suppressing pitch or bounce vibration is reduced. As a result, some degree of nose-down occurs in the vehicle body, and the grounding load is increased while the yaw moment is significantly increased, as compared with those during steady traveling; therefore, deterioration of the response of the yaw rate due to the vibration damping control can be curbed by some degree. Also, with the arrangement in which the magnitude of the compensation component is reduced as the magnitude of the steering angle velocity increases, the effect of vibration damping control is not prevented from being suddenly eliminated; therefore, no rapid changes occur to the drive output and the vibrating state of the vehicle body, and the driver's feeling of strangeness is expected to be reduced. In this connection, even when the steering angle is changed to be returned to 0 so as to bring the vehicle that is in a state of turning, back into a straight travelling state, too, the magnitude of the compensation component may be reduced as described above. When the steering angle is changed to be returned to 0, the rolling resistance of each tire is reduced; therefore, (if there is no vibration damping control) the attitude of the vehicle body changes in a nose-up direction, whereby the grounding load of the front wheels is reduced, the cornering force is reduced, and the yaw rate is rapidly reduced. However, while the vibration damping control is being performed, the control functions to cancel change in the attitude of the vehicle body in the nose-up direction, and the grounding load of the front wheels is increased, as compared with the case where the vibration damping control is not performed. Accordingly, the cornering force is reduced at a reduced rate, and the response (rapidness of reduction) of the yaw rate is deteriorated. Accordingly, if the compensation component (control quantity) is reduced based on the steering angle velocity, as described above, the attitude of the vehicle body changes in the nose-up direction, and the response of the yaw rate is less likely or unlikely to be deteriorated.

In the above aspect of the invention, a control gain of the compensation component, namely, a gain that determines the magnitude of the compensation component when it is given to the drive output, may be a function of the magnitude of the steering angle velocity, and the compensation component adjusting unit may set the gain of the compensation component such that the gain monotonously decreases as the magnitude of the steering angle velocity of the vehicle increases, when the magnitude of the steering angle velocity of the vehicle is smaller than a predetermined velocity. With this arrangement, when the steering angle velocity of the vehicle changes, the control gain of the compensation component changes continuously; therefore, the effect of the vibration damping control is continuously changed, and the driver is less likely or unlikely to feel strange or uncomfortable about change in the control.

Further, regarding the above-described vibration damping control, the effect of vibration damping control is reduced as the magnitude of the steering angle velocity of the vehicle increases; however, it is still preferable to maintain the effect of vibration damping control to some extent without completely eliminating it. Thus, the device according to the above aspect of the invention may be configured so as not to further reduce the amplitude of the compensation component, when the magnitude of the steering angle velocity of the vehicle becomes larger than a predetermined velocity. In the above aspect of the invention, the compensation component adjusting unit may make a rate of reduction of the amplitude of the compensation component relative to the amplitude of the pitch/bounce vibration constant when the magnitude of the steering angle velocity of the vehicle exceeds a predetermined velocity. When the magnitude of the compensation component given to the drive output is determined by a control gain, the control gain in reduced with the magnitude of the steering angle velocity. However, when the magnitude of the steering angle velocity reaches the predetermined velocity, or the control gain is reduced down to a predetermined value, the control gain may not be further reduced.

A vibration damping control system according to a second aspect of the invention includes a drive unit that generates driving force at wheels of a vehicle, a wheel speed sensor that detects a rotational speed of each of the wheels of the vehicle, a steering angle sensor that detects a steering angle of a steering wheel of the vehicle, and an electronic control unit that obtains a first driving force according to an amount of depression of an accelerator pedal, and drives the drive unit with a second driving force that is determined by a compensation component with which the first driving force is corrected so as to suppress pitch/bounce vibration of the vehicle, based on the first driving force and the rotational speed. In the system, the electronic control unit reduces an amplitude of the compensation component as a magnitude of a steering angle velocity obtained from the steering angle increases.

Thus, according to the invention as described above, while the driver is operating the steering wheel, for example, and the steering angle of the wheels is changing, the compensation component (control quantity) of the wheel torque given to drive output control for vibration damping control is reduced in accordance with increase of the steering angle velocity. With the operation of this control, when the vehicle starts turning, or the direction of turning is changed into such a direction as to increase the magnitude of the steering angle, the function or effect of vibration damping, which leads to reduced nose-down, is reduced, so that the yaw moment can be significantly generated or increased, and the yaw rate can be more rapidly increased. When the vehicle stops turning or the turning direction is changed into such a direction as to reduce the magnitude of the steering angle, the function or effect of vibration damping, which leads to reduced nose-up, is reduced, so that the yaw moment can be more rapidly reduced, and the yaw rate can be more promptly reduced. Then, since the degree of reduction of the effect of the vibration damping control changes with change in the magnitude of the steering angle velocity, the effect of the vibration damping control is not suddenly changed, and the driver is less likely or unlikely to feel strange or uncomfortable. It is to be understood in the above arrangement that the effect of the vibration damping control is reduced according to the invention, only in the case where the steering angle velocity is a significant value. Namely, while the vehicle is traveling straight, or while the vehicle is in a steady turning action (the steering angle is constant, and the steering angle velocity is equal to 0), the effect of the vibration damping control according to the invention is not reduced. Accordingly, if there is no other control for reducing the effect of the vibration damping control, the effect of the vibration damping control is exhibited or provided at a normal level, and pitch/bounce vibration is suppressed, during steady turning of the vehicle. The reduction of the effect of the vibration damping control according to this invention is carried out only when the turning direction of the vehicle is changed, and the yaw rate is changed (namely, when the steering angle is changed, so that the rolling resistance of the tires is changed, and the wheel torque is changed).

According to the above-described aspect of the invention, the vibration damping control device that is improved so that the effect of vibration damping control does not rapidly change during steering operation by the driver can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A and FIG. 3B are views illustrating dynamic motion models of vehicle body vibration envisaged in the vibration damping control device of the preferred embodiment of the invention, wherein FIG. 3A shows the case where a sprung-mass vibration model is used, and FIG. 3B shows the case where a sprung-mass/unsprung-mass vibration model is used;

DETAILED DESCRIPTION OF EMBODIMENTS

Figure 1A:
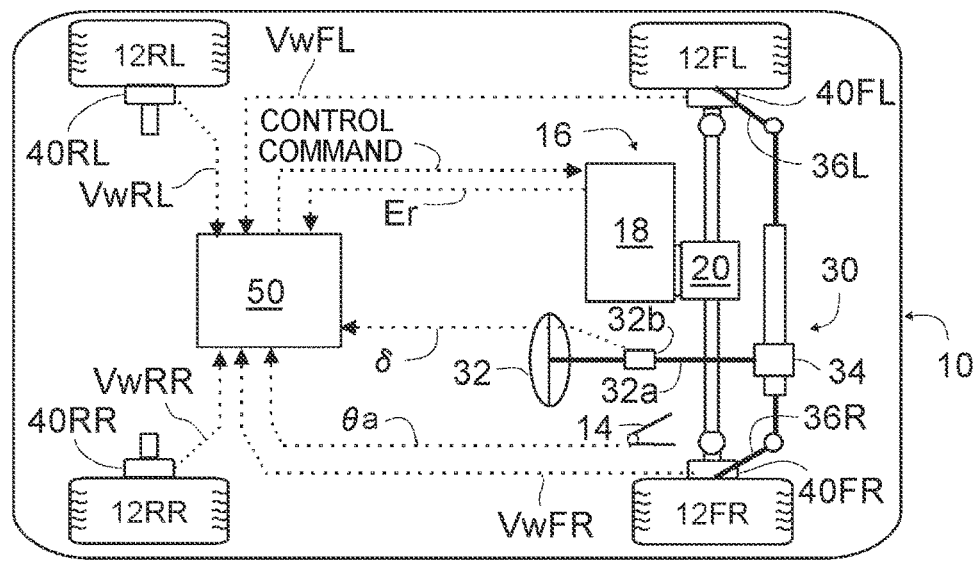
FIG. 1A is a schematic view of an automobile in which a vibration damping control device as a preferred embodiment of the invention is realized.

Referring to the accompanying drawings, some preferred embodiments of the invention will be described in detail. In the drawings, the same reference numerals denote the same parts or components.

Configuration of Device

FIG. 1A schematically shows an automobile on which a vibration damping control device according to a preferred embodiment of the invention is installed. In FIG. 1A, the vehicle 10 having left and right front wheels 12FL, 12FR and left and right rear wheels 12RL, 12RR is equipped with a drive unit 16 that generates driving force to the front wheels according to depression of an accelerator pedal 14 by a driver, in a normal mode, and a steering device 30 that turns the left and right front wheels. In the illustrated embodiment, the drive unit 16 is configured to transmit driving torque or rotary driving force from an engine 18 to the front wheels 12FL, 12FR, via a transaxle 20. The drive unit 16 may be an electric drive unit using an electric motor in place of the engine 18, or may be a hybrid type drive unit having both an engine and an electric motor. The steering device 30 transmits rotation of a steering wheel 32 rotated by the driver, to tie rods 36L, 36R, via a steering gear mechanism 34, so as to turn the front wheels 12FL, 12FR. The vehicle may be a four-wheel-drive vehicle in which driving force is transmitted to the rear wheels as well as the front wheels. Although not illustrated in the drawing for the sake of simplicity, the vehicle 10 is provided with a braking system that generates braking force to respective wheels, like general vehicles.

The operation of the drive unit 16 is controlled by an electronic control unit 50. The electronic control unit 50 may include a microcomputer having CPU, ROM, RAM and an input/output port device, which are connected to each other via a bidirectional common bus of a normal type, and a drive circuit. The configuration and operation of each unit of the vibration damping control device of the invention as described later may be realized by operation of the electronic control unit (computer) 50 according to programs. The electronic control unit 50 receives signals indicative of wheel speeds Vwi (i=FL, FR, RL, RR) from wheel speed sensors 40i (i=FL, FR, RL, RR) installed at the respective wheels, and signals, such as a rotational speed Er of the engine and an accelerator pedal depression amount θa from sensors provided in respective parts of the vehicle, and a steering angle δ from a steering angle sensor 32b provided on a steering shaft 32a. It is to be understood that the electronic control unit 50 may also receive various detection signals for obtaining various parameters needed for various controls to be performed in the vehicle of this embodiment, other than the above-indicated signals. For example, the electronic control unit 50 may receive a yaw rate detected by a yaw rate sensor, a lateral acceleration detected by a G sensor, and gear position information of a transmission.

Figure 1B:
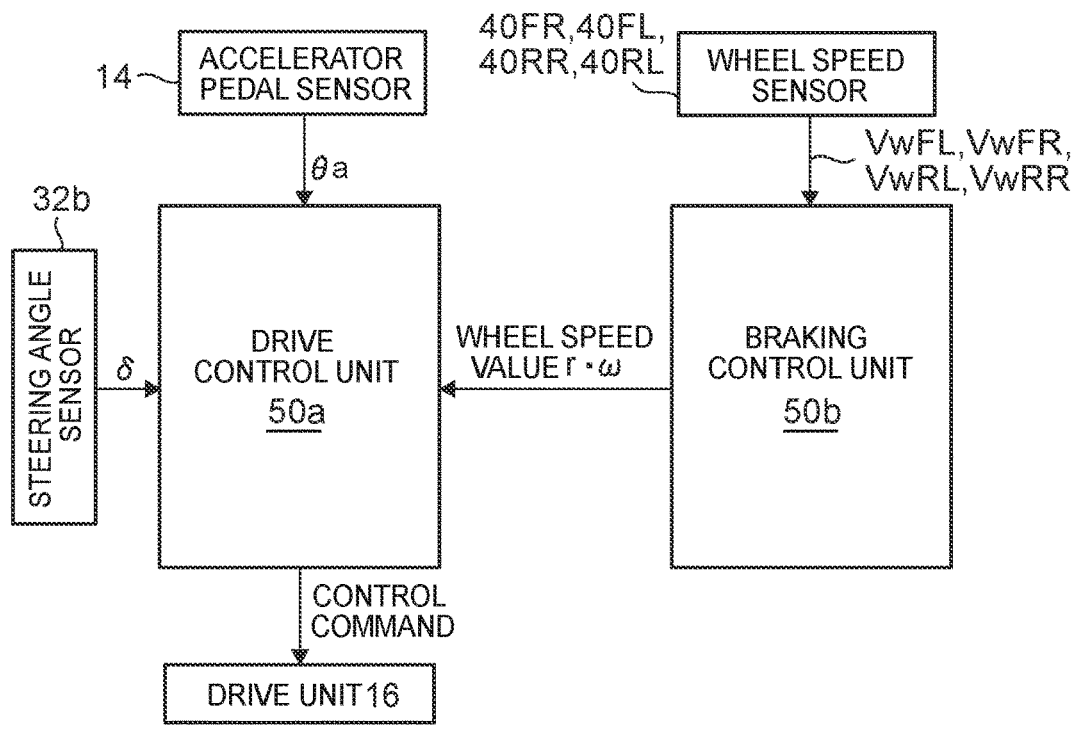
FIG. 1B is a schematic view showing the internal configuration of an electronic control unit of FIG. 1A in greater detail.

FIG. 1B is a schematic view showing the internal configuration of the electronic control unit 50 in greater detail. The electronic control unit 50 may consist of a drive control unit 50a that controls operation of the drive unit 16, and a braking control unit 50b that controls operation of a braking system (not shown). The braking control device receives a signal from the wheel speed sensor 40i of each wheel, and calculates a rotational speed ω of the wheel. Then, a wheel speed value of each wheel is calculated by multiplying the rotational speed ω by a wheel radius r, and the wheel speed value is transmitted to the drive control unit 50a, for use in calculation of a wheel torque estimated value, as will be described below. Computation for converting the wheel rotational speed to the wheel speed may be performed by the drive control unit 50a. In this case, the wheel rotational speed is supplied from the braking control unit 50b to the drive control unit 50a. Also, the steering angle δ is supplied from the steering angle sensor 32b to the drive control unit 50a, for the purpose as will be described below in more detail.

In the drive control unit 50a, a drive request from the driver, i.e., a target output torque (driver-requested torque) of the drive unit requested by the driver, is determined, based on the accelerator pedal depression amount θa (and the vehicle speed, gear position information, etc.). However, the drive control unit of the invention corrects the driver-requested torque so as to perform pitch/bounce vibration damping control on the vehicle body through driving force control, and sends a control command corresponding to the corrected requested torque to the drive unit 16. In the pitch/bounce vibration damping control, (1) calculation of an estimated value of the wheel torque of the drive wheels based on force applied between the drive wheels and a road surface, (2) computation of quantities of state of pitch/bounce vibration based on a motion model of vehicle body vibration, and (3) calculation of a compensation component (correction amount) of the wheel torque which suppresses or reduces the state quantities of pitch/bounce vibration, and compensation of the requested torque based on the compensation component, are carried out. It is to be understood that the vibration damping control device of the invention is realized through processing operations of (1)-(3).

Figure 2A:
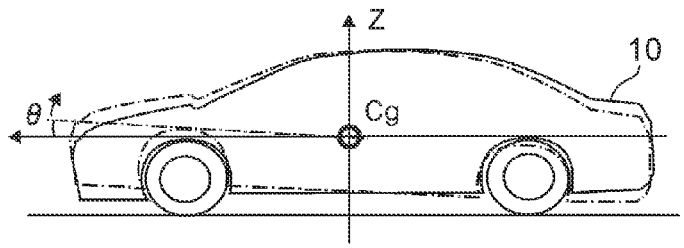
FIG. 2A is a view useful for explaining state variables of vehicle body vibration suppressed by the vibration damping control device as one preferred embodiment of the invention.

Configuration of Driving Force Control for Performing Pitch/Bounce Vibration Damping Control on Vehicle Body In the vehicle 10 as illustrated in FIG. 2A by way of example, if the drive unit operates based on the driver's drive request, and the wheel torque fluctuates, bounce vibration may occur in the vertical direction (z direction) of the center of gravity Cg of the vehicle body, and pitch vibration may occur in the pitch direction (θ direction) about the center of gravity of the vehicle body. Also, if external force or torque (disturbance) is applied from the road surface onto the wheel(s) during traveling of the vehicle, the disturbance may be transmitted to the vehicle, and vibration may be generated in the vehicle body in the bounce direction and pitch direction. Thus, in the illustrated embodiment, a motion model of pitch/bounce vibration of the vehicle body is constructed, and state variables of vehicle body vibration, i.e., displacements z, θ and the rates of change thereof dz/dt, dθ/dt when the model receives the driver-requested torque (a value of wheel torque into which the driver-requested torque is converted), and the current wheel torque (its estimated value) are calculated. Then, the drive torque of the drive unit is adjusted (the driver-requested torque is corrected), so that the state variables obtained from the model are converged to zero, namely, the pitch/bounce vibration is suppressed.

Figure 2B:
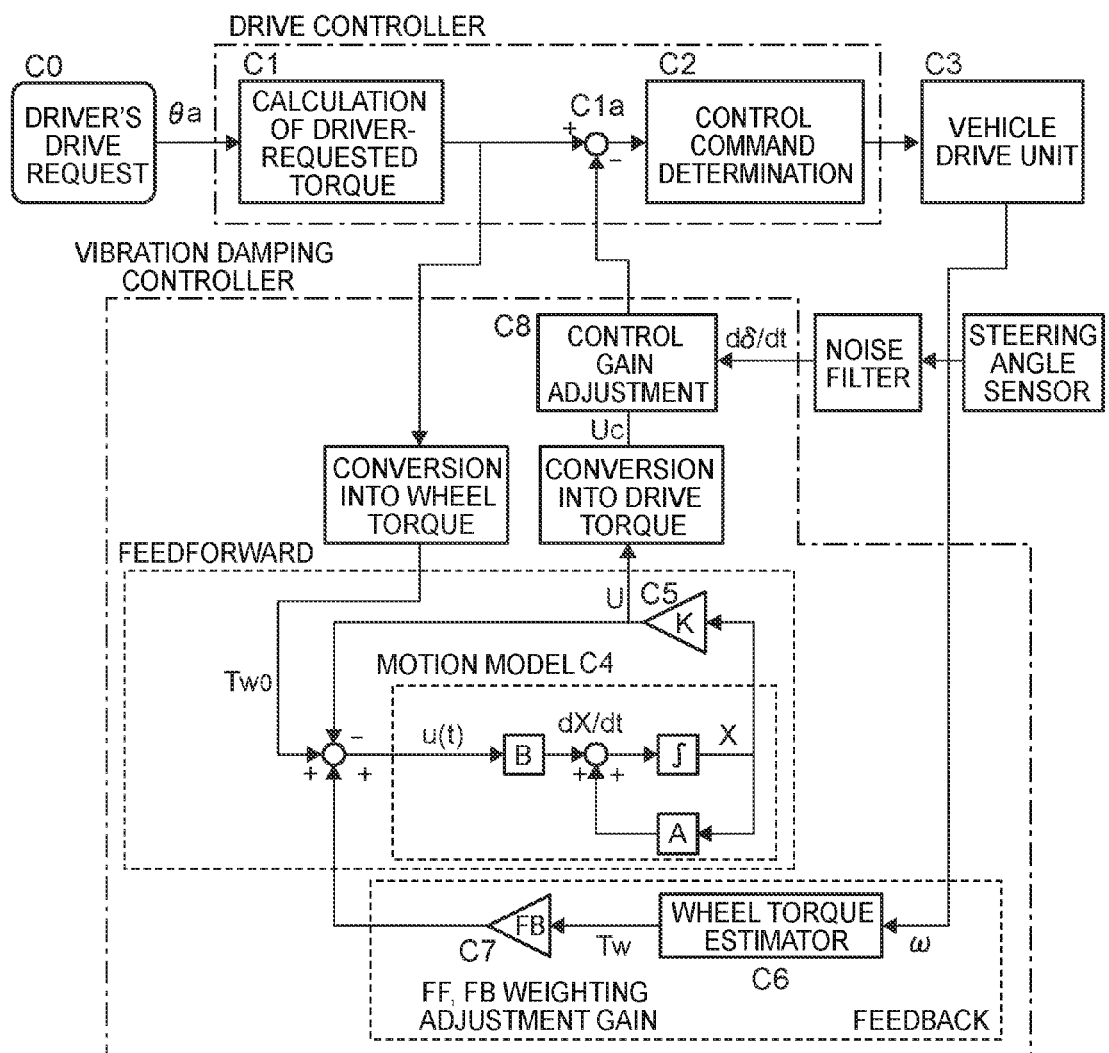
FIG. 2B is a view in the form of a control block diagram showing the configuration of vibration damping control according to the preferred embodiment of the invention.

FIG. 2B schematically illustrates the configuration of the driving force control according to this embodiment of the invention, in the form of control blocks. The operation of each control block (except for C0, C3) is carried out by the drive control unit 50a or braking control unit 50b of the electronic control unit 50. Referring to FIG. 2B, the arrangement for the driving force control of this embodiment of the invention is generally constituted by a drive controller that supplies the driver's drive request to the vehicle, and a vibration damping controller that adjusts the driver's drive request so as to suppress pitch/bounce vibration of the vehicle body. In the drive controller, the driver's drive request, namely, the depression amount (C0) of the accelerator pedal, is converted into driver-requested torque (C1) in a normal fashion, and then, the driver-requested torque is converted into a control command for the drive unit (C2), and transmitted to the drive unit (C3). The control command is a target throttle opening when the drive unit is a gasoline engine, and is a target fuel injection amount when it is a diesel engine, while the control command is a target current amount when the drive unit is a motor.

On the other hand, the vibration damping controller consists of a feedforward control section and a feedback control section. The feedforward control section has the configuration of so-called optimum regulator, in which a motion model section (C4) of pitch/bounce vibration of the vehicle body receives a value (requested wheel torque Tw0) obtained by converting the driver-requested torque of C1 into wheel torque. In the motion model section (C4), state variables of the vehicle body responsive to the received torque are calculated. In the feedforward control portion, a correction amount of the driver-requested wheel torque for minimizing the state variables, namely, a compensation component for adjusting the wheel torque, is calculated (C5). In the feedback control portion, on the other hand, the wheel torque estimated value Tw is calculated by processing which will be described later, in a wheel torque estimator (C6). Then, the wheel torque estimated value is multiplied by a FB gain (a gain for adjusting a balance between contributions of the driver-requested wheel torque Tw0 and the wheel torque estimated value Tw in the motion model), and then added as a disturbance input to the driver-requested torque, to be received by the motion model section (C4). In this manner, a compensation component for the driver-requested wheel torque with respect to the disturbance is also calculated. The compensation component of the driver-requested wheel torque of C5 is converted into the unit of requested torque of the drive unit, and is transmitted to an adder (C1a). In this manner, after the driver-requested torque, which has been adjusted so that no pitch/bounce vibration is generated, is converted into the control command (C2), which in turn is transmitted to the drive unit (C3).

In the above-described configuration, in order to curb reduction of the response of the yaw rate due to execution of vibration damping control, and make the driver feel less strange or uncomfortable, while the steering angle of the drive wheels (front wheels) changes during turning of the vehicle, the amplitude of the compensation component of the wheel torque received by the adder C1a is reduced as the steering angle velocity increases, in the case of this invention. To this end, in the vibration damping control device of this embodiment as described above, a control gain adjusting unit (C8) is provided as shown in FIG. 2, for adjusting a control gain of the compensation component of the wheel torque according to the steering angle velocity, with reference to a detected value of the steering angle obtained from the steering angle sensor. The detected value of the steering angle is passed through a filter that removes noise from the detected value, and then transmitted to the control gain adjusting unit (C8).

Principle of Vibration Damping Control

In the vibration damping control according to the embodiment of the invention, a dynamic motion model of the bounce direction and pitch direction of the vehicle body is envisaged, and state equations of state variables in the bounce direction and pitch direction when receiving the driver-requested wheel torque Tw0 and the wheel torque estimated value Tw (disturbance) as inputs are constructed. Then, from the state equations, an input (torque value) that reduces the state variables in the bounce direction and pitch direction to zero using the theory of the optimum regulator is determined, and the driver-requested torque is corrected based on the obtained torque value.

Figure 3A:
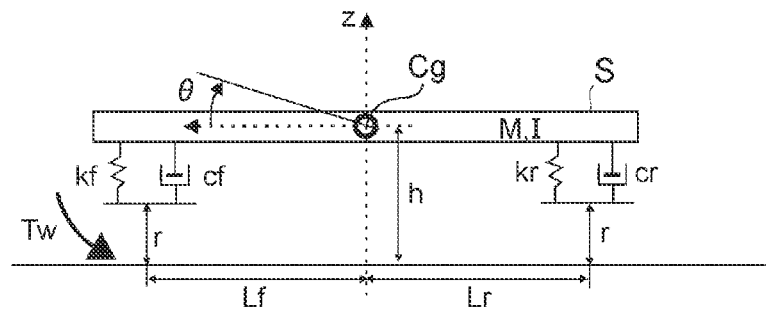

As the dynamic motion model of the bounce direction and pitch direction of the vehicle body, the vehicle body is regarded as a rigid body S having a mass M and a moment of inertia I, and the rigid body S is supposed to be supported by a front-wheel suspension having a modulus of elasticity kf and a damping rate cf, and a rear-wheel suspension having a modulus of elasticity kr and a damping rate cr, as shown in FIG. 3A, for example. Namely, the dynamic motion model shown in FIG. 3A is a sprung-mass vibration model of the vehicle body. In this case, an equation of motion in the bounce direction and an equation of motion in the pitch direction, of the center of gravity of the vehicle body, are expressed as in Eq. (1a) and Eq. (1b) below.

$$M\frac{d^2z}{dt^2} = -kf(z + Lf \cdot \theta) - cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right) \quad (1a)$$

$$I\frac{d^2\theta}{dt^2} = -Lf\left\{kf(z + Lf \cdot \theta) - cf\left(\frac{dz}{dt} + Lf \cdot \frac{d\theta}{dt}\right)\right\} + Lr\left\{kr(z - Lr \cdot \theta) + cr\left(\frac{dz}{dt} - Lr \cdot \frac{d\theta}{dt}\right)\right\} + \frac{h}{r} \cdot T \quad (1b)$$

where Lf, Lr are distances from the center of gravity to the axle of the front wheels and the axle of the rear wheels, respectively, r is the wheel radius, and h is the height of the gravity center from the road surface. In Eq. (1a), the first and second terms represent a component of force from the front wheel axle, and the third and fourth terms represent a component of force from the rear wheel axle. In Eq. (1b), the first term represents a moment component of force from the front wheel axle, and the second term represents a moment component of force from the rear wheel axle. The third term in Eq. (1b) represents a moment component of force provided by the wheel torque T (=Tw0+Tw) generated at the drive wheels around the center of gravity of the vehicle body.

The above-indicated equations (1a) and (1b) may be written into the form of a state equation (of a linear system) as indicated by the following equation (2a), where the displacement z of the vehicle body, θ, and the rates of change thereof dz/dt, dθ/dt constitute a state variable vector X(t).

$$dX(t)/dt = A \cdot (x)X(t) + B \cdot (x)u(t) \quad (2a)$$

where X(t), A, and B are:

$$X(t) = \begin{pmatrix} z \\ \frac{dz}{dt} \\ \theta \\ \frac{d\theta}{dt} \end{pmatrix}, \quad (2)$$

$$A = \begin{pmatrix} 0 & 1 & 0 & 0 \\ a1 & a2 & a3 & a4 \\ 0 & 0 & 0 & 1 \\ b1 & b2 & b3 & b4 \end{pmatrix},$$

$$B = \begin{pmatrix} 0 \\ 0 \\ 0 \\ p1 \end{pmatrix}$$

The respective elements a1-a4 and b1-b4 of matrix A are given by collecting coefficients of z, θ, dz/dt and dθ/dt in Eqs. (1a) and (1b), and are expressed as follows: a1=−(kf+kr)/M, a2=−(cf+cr)/M, a3=−(kf·Lf−kr·Lr)/M, a4=−(cf·Lf−cr·Lr)/M, b1=−(Lf·kf−Lr·kr)/I, b2=−(Lf·cf−Lr·cr)/I, b3=−(Lf²·kf+Lr²·kr)/I, b4=−(Lf²·cf+Lr²·cr)/I. Also, u(t) is equal to T (u(t)=T), and is an input of the system represented by the state equation (2a). Accordingly, the element p1 of matrix B is expressed as follows: p1=h/(I·r), from Eq. (1b) above.

Where u(t) is equal to −K·X(t) (u(t)=−K·X(t) (2b)) in the state equation (2a), the state equation (2a) will be as follows: dX(t)/dt=(A−BK)·X(t) (2c). Accordingly, when the initial values $X_0(t)$ of X(t) are set such that $X_0(t)$=(0, 0, 0, 0) (it is assumed that there is no vibration before torque is received), and the differential equation (2c) of the state variable vector X(t) is solved, the torque value u(t) that suppresses bounce/pitch vibration is determined if a gain K for converging the magnitudes of X(t), i.e., displacements in the bounce direction and pitch direction and their rates of change, to zero is determined.

The gain K can be determined by using the theory of the so-called optimum regulator. According to this theory, it is known that X(t) is stably converged in the state equation (2a) when a value of an evaluation function: $J=1/2 \cdot \int (X^T QX + u^T Ru) dt$ (3a) as a quadratic function (the range of integral is from 0 to ∞) is minimized, and matrix K that minimizes the evaluation function J is given by $K=R^{-1} \cdot B^T \cdot P$. Here, P is a solution of a Riccati's equation: $-dP/dt = A^T P + PA + Q − PBR^{-1}B^T P$. The Riccati's equation can be solved by any method known in the field of linear system, and the gain K is determined by solving this equation.

Q and R in the evaluation function J and the Riccati's equation are a semi-positive definite symmetric matrix and a positive definite symmetric matrix, respectively, which are arbitrarily set, and they are weighting matrices of the evaluation function J determined by the designer of the system. For example, in the case of the motion model considered herein, if Q, R are set as follows, $$Q = \begin{pmatrix} q_1 & 0 & 0 & 0 \\ 0 & q_2 & 0 & 0 \\ 0 & 0 & q_3 & 0 \\ 0 & 0 & 0 & q_4 \end{pmatrix}, \quad (3)$$

$$R = (\rho)$$

and the norms (magnitudes) of particular ones of components of the state vector, for example, those of dz/dt, dθ/dt, are set to be larger than the norms of the other components, e.g., z, θ, in Eq. (3a), the components whose norms are set to be larger are relatively, more stably converged. If values of components of Q are increased, a transient characteristic is emphasized, namely, values of the state vector are quickly converged to stable values. If the value of R is increased, the consumption energy is reduced.

In the actual vibration damping control, as indicated in the block diagram of FIG. 2B, the state variable vector X(t) is calculated by solving the differential equation of Eq. (2a) using a torque input value, in the motion model C4. Then, in C5, a compensation component U(t) obtained by multiplying the state vector X(t) as an output of the motion model C4 by the gain K determined so as to converge the state variable vector X(t) to zero or the minimum value as described above is converted into torque of the drive unit, and is subtracted from the driver-requested torque in the adder (C1a). For computation of the motion model C4, the compensation component U(t) is also fed back to the torque input value of the motion model C4 (state feedback). The system represented by Eq. (1a) and Eq. (1b) is a resonance system, and values of the state variable vector responsive to any given input are substantially only natural-frequency components of the system. Accordingly, if the system is configured to subtract U(t) (its converted value Uc) from the driver-requested torque, a natural-frequency component of the system in the driver-requested torque, namely, a component that induces pitch/bounce vibration in the vehicle body, is corrected, and the pitch/bounce vibration in the vehicle body is suppressed. If the natural-frequency component of the system is eliminated from the requested torque given by the driver, a natural-frequency component of the system, in the requested torque command received by the drive unit, is only −U(t), and vibration displacement due to Tw (disturbance) is converged.

Figure 3B:
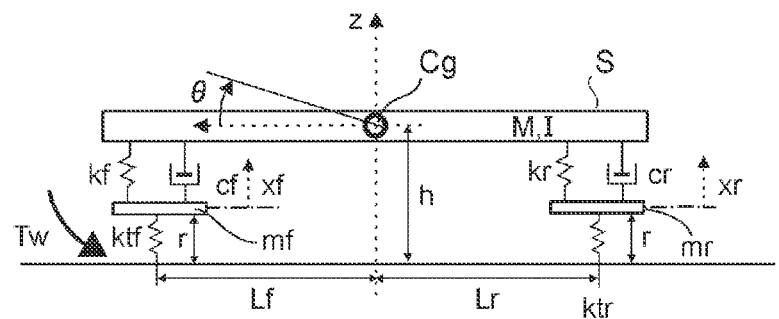

As a dynamic motion model in the bounce direction and pitch direction of the vehicle body, a model (sprung-mass and unsprung-mass vibration model of the vehicle body) taking account of spring elasticity of tires of the front wheels and rear wheels, as shown in FIG. 3B, may be employed, in addition to the arrangement of FIG. 3A. If the tires of the front wheels and rear wheels have the modulus of elasticity ktf, ktr, respectively, the equation of motion in the bounce direction and the equation of motion in the pitch direction, of the center of gravity of the vehicle body, are expressed as follows by Eq. (4a) through Eq. (4d), as is understood from FIG. 3B.

$$M\frac{d^2z}{dt^2} = -kf(z + Lf \cdot \theta - xf) - cf\left(\frac{dz}{dt} + Lf \cdot \frac{d\theta}{dt} - \frac{dxf}{dt}\right) - \quad (4a)$$
$$kr(z - Lr \cdot \theta - xr) - cr\left(\frac{dz}{dt} - Lr \cdot \frac{d\theta}{dt} - \frac{dxr}{dt}\right)$$

$$I\frac{d^2\theta}{dt^2} = -Lf\left\{kf(z + Lf \cdot \theta - xf) - cf\left(\frac{dz}{dt} + Lf \cdot \frac{d\theta}{dt} - \frac{dxf}{dt}\right)\right\} + \quad (4b)$$
$$Lr\left\{kr(z - Lr \cdot \theta - xr) + cr\left(\frac{dz}{dt} - Lr \cdot \frac{d\theta}{dt} - \frac{dxr}{dt}\right)\right\} + \frac{h}{r} \cdot T$$

$$mf\frac{d^2xf}{dt^2} = kf(z + Lf \cdot \theta - xf) + cf\left(\frac{dz}{dt} + Lf \cdot \frac{d\theta}{dt} - \frac{dxf}{dt}\right) + ktf \cdot xf \quad (4c)$$

$$mr\frac{d^2xr}{dt^2} = kr(z - Lr \cdot \theta - xr) + cr\left(\frac{dz}{dt} - Lr \cdot \frac{d\theta}{dt} - \frac{dxr}{dt}\right) + ktr \cdot xr \quad (4d)$$

where xf, xr are the amounts of unsprung-mass displacement of the front wheels and rear wheels, and mf, mr are unsprung masses of the front wheels and rear wheels. Eq. (4a)-Eq. (4d) constitute a state equation (in which matrix A is a 8×8 matrix, and matrix B is a 8×1 matrix) as indicated by Eq. (2a), as in the case of FIG. 3A, in which z, θ, xf, xr, and time differential values of these variables are used for the state variable vector. Then, a gain matrix K that can converge the magnitude of the state variable vector to zero can be determined according to the theory of the optimum regulator. The actual vibration damping control is similar to that of the case of FIG. 3.

(Calculation of Estimated Value of Wheel Torque) In the feedback control section of the vibration damping controller of FIG. 2B, the wheel torque Tw received as a disturbance by the feedforward control section may be obtained by estimating wheel torque that is actually produced at the wheels by any given method. For example, the wheel torque may be estimated according to following Eq. (5), using the wheel rotational speed ω obtained from the wheel speed sensors of the drive wheels or a time differential of the wheel speed value r·ω.

$$Tw = M \cdot r^2 \cdot d\omega/dt \quad (5)$$

In Eq. (5), M is the mass of the vehicle, and r is a the wheel radius. If the sum of driving forces generated at portions where the drive wheels contact the road surface is equal to the overall driving force M·G (where G is acceleration) of the vehicle, the wheel torque Tw is given by following Eq. (5a).

$$Tw = M \cdot G \cdot r \quad (5a)$$

Since the acceleration G of the vehicle is given by following Eq. (5b), from a differential value of the wheel speed r·ω, the wheel torque is estimated according to Eq. (5).

$$G = r \cdot d\omega/dt \quad (5b)$$

(Correction of Vibration Damping Control During Turning of Vehicle)

Figure 4:
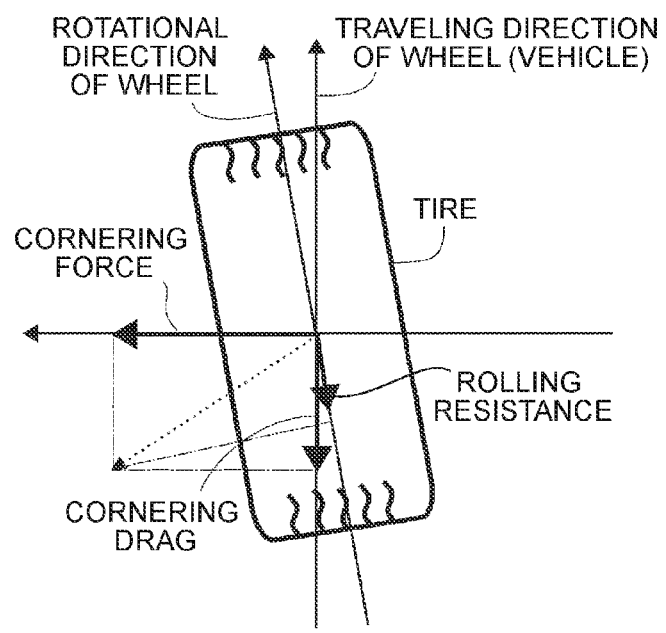
FIG. 4 is a view useful for explaining rolling resistance generated in a wheel that is turned by steering.

When a wheel is turned by steering, "rolling resistance" arises in the wheel in a direction opposite to the rotational direction of the wheel, as schematically depicted in FIG. 4. As well known in the art, if the rotational direction of the wheel is inclined relative to the traveling direction (upward in FIG. 4) of the vehicle, the tire of the wheel is distorted, whereby cornering force arises in a direction perpendicular to the traveling direction of the vehicle, and a cornering drag arises in a direction opposite to the traveling direction of the vehicle. At this time, the sum of components of the cornering drag and the cornering force in the rotational direction of the wheel (rolling resistance) appears in the direction opposite to the rotational direction of the wheel, and this force provides torque that reduces rotation of the wheel. Accordingly, if the wheel (drive wheel) is turned by steering during driving of the vehicle, and the rotational direction of the wheel shifts from the traveling direction of the vehicle, a component of the wheel torque appears in the direction opposite to the rotational direction of the wheel. Since the component of the wheel torque in the direction opposite to the rotational direction of the wheel is applied as braking force to the wheel, the braking force is applied to the front wheel as a steerable wheel, and nose-down behavior takes place in the vehicle body. As a result, a grounding load of the front wheel increases, and the cornering force is effectively generated, so that the yaw moment is generated or increased in the direction of steering, and the yaw rate is increased.

However, in the case where the above-described vibration damping control is being carried out, while steering is performed and a component of the wheel torque is generated in the direction opposite to the rotational direction of the wheel, the compensation component of the wheel torque makes the wheel torque corrected in such a direction as to eliminate the component in the direction opposite to the rotational direction of the wheel. As a result, the nose-down behavior of the vehicle body is suppressed, and the grounding load is not increased. Thus, the yaw moment that arises in the steering direction is reduced (as compared with the case where the vibration damping control is not performed), and the rate of increase of the yaw rate is reduced. Namely, the response of the yaw rate is deteriorated. These phenomena take place only while the steering angle is changing. Accordingly, when the steering angle is in a constant state, and the vehicle is making a steady turn, it is preferable to suppress vibration of the vehicle body due to fluctuations in the wheel torque caused by road disturbance, or the like.

Thus, according to the invention, the steering angle velocity is calculated from detected values of the steering angle from the steering angle sensor, as explained above with reference to FIG. 2B. When the steering angle velocity is a significant value, namely, while the steering angle is increasing and the rolling resistance is increasing, the effect of vibration damping control is reduced, based on the steering angle velocity, in order to curb deterioration of the response of the yaw rate.

More specifically, in the control gain adjusting unit of FIG. 2B, the compensation component Uc is multiplied by a control gain G as a function of the steering angle velocity.

$$Uc \leftarrow GUc \quad (6)$$

Figure 5A:
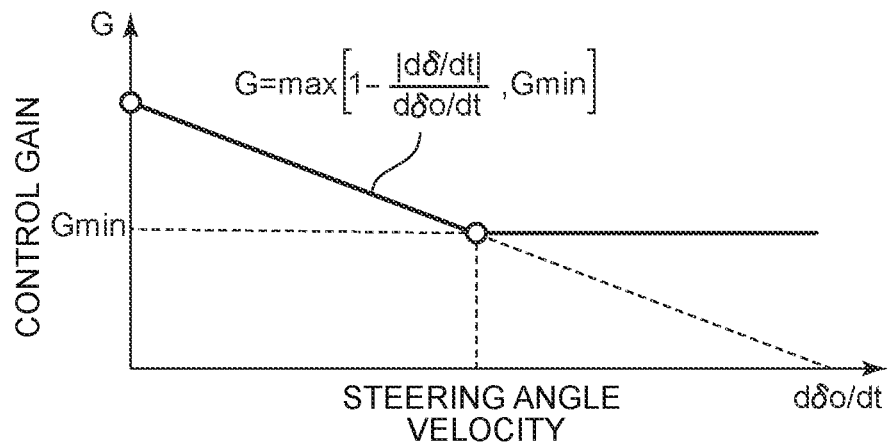
FIG. 5A is a view in the form of a graph indicating change of a control gain of a compensation component with which wheel torque is corrected, relative to the steering angle velocity.

More specifically, G may be a function that decreases as the magnitude of the steering angle velocity increases, and may be a function:

$$G = 1 - \frac{|d\delta/dt|}{d\delta o/dt} \quad (7a)$$

which varies as illustrated in FIG. 5A, for example. In Eq. (7a), $d\delta o/dt$ is a reference value that may be set as desired. In this case, G is set to 1.0 (G=1.0) when the steering angle velocity is equal to 0.

Also, even when the magnitude of the steering angle velocity becomes significantly large, it is preferable that the effect of the vibration damping control can be maintained to some extent. Thus, as shown in FIG. 5A, when the control gain G calculated according to Eq. (7a) becomes smaller than a predetermined threshold value Gmin, the control gain G actually used may be kept at Gmin. Accordingly, the control gain may be given by the following equation.

$$G = \max\left[1 - \frac{|d\delta/dt|}{d\delta o/dt}, Gmin\right] \quad (7b)$$

Figure 5B:
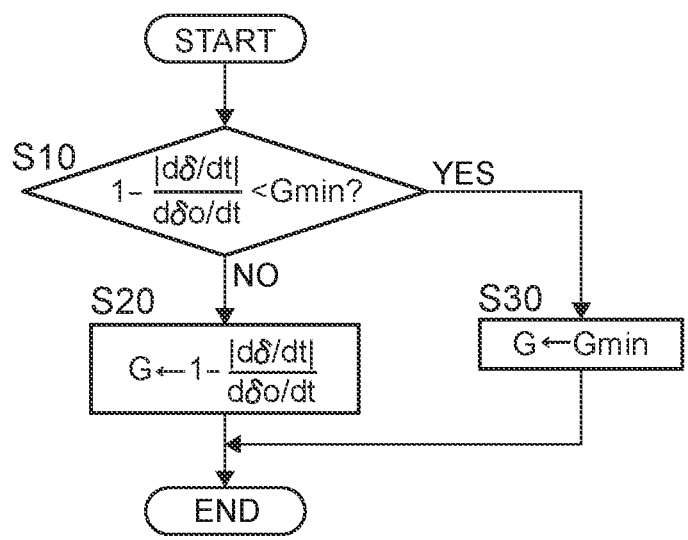
FIG. 5B is a view in the form of a flowchart illustrating processing for determining the control gain.

FIG. 5B illustrates processing of control gain calculation performed in the control gain adjusting unit in the form of a flowchart. Referring to FIG. 5B, when G calculated according to Eq. (7a) is larger than Gmin (step S10), the value of Eq. (7a) is used as it is (step S20). When G calculated according to Eq. (7a) is smaller than Gmin, Gmin is used as the control gain (step S30). Since the steering angle velocity $d\delta th/dt$ when the control gain G is fixed to Gmin is given by following Eq. (8), it may be determined in the above step S10 whether following Eq. (8).

$$d\delta th/dt = d\delta o/dt(1-Gmin) \quad (8)$$

In the case where the adjustment of the control gain as described above is applied, if steering is started during traveling of the vehicle, the effect of the vibration damping control is gradually reduced as the steering angle velocity increases, so that the driver is less likely or unlikely to feel strange or uncomfortable since the effect is prevented from being rapidly changed. At the same time, nose-down of the vehicle body is allowed to occur, and deterioration of the response of the yaw rate is curbed. Also, since the reduction of the control gain is limited at Gmin, the effect of the vibration damping control is not completely eliminated. For example, when a road surface disturbance that is irrelevant to steering operation is received, vibration caused by the disturbance can be reduced.

In the meantime, when the magnitude of the steering angle is changed in a decreasing direction, in a vehicle that is already in a turning action, the effect of the vibration damping control may be reduced based on the steering angle velocity, in the manner as described above. When the magnitude of the steering angle is changed in the decreasing direction, the rolling resistance of the tire is reduced; therefore, the braking force is reduced, and the attitude of the vehicle body changes in a nose-up direction by a larger degree than before. Accordingly, the grounding load of the front wheel is reduced, and the cornering force is reduced, resulting in rapid reduction of the yaw rate. In connection with this point, the vibration damping control functions to cancel change in the attitude of the vehicle body in the nose-up direction, whereby the grounding load of the front wheel is not reduced, and the cornering force is reduced at a reduced rate, while the response (rapidness in reduction) of the yaw rate is deteriorated. Accordingly, if the effect of the vibration damping control is reduced based on the steering angle velocity, as described above, the attitude of the vehicle body changes accordingly in the nose-up direction, so that deterioration of the response of the yaw rate can be curbed. Namely, the processing of calculating the control gain G as a function of the magnitude of the steering angle velocity may be carried out as it is irrespective of the direction of change of the steering angle velocity.

While the above description is related to the embodiment of the invention, it would be apparent to those skilled in the art that the embodiment may be easily modified or changed in many points, the invention is not limited only to the embodiment illustrated above, and that the invention may be applied to various types of devices or systems without departing from the concept of the invention.

For example, it is to be understood that substantially the same effect can be obtained even if the control gain adjusting unit C8 of FIG. 2B as described above is inserted at any given location between the output of the wheel torque estimator (C6) in the feedback section and the input of the motion model portion C4. In this case, the adjustment of the amplitude of the compensation component is applied to the feedback control input portion, but not applied to the compensation component corresponding to torque (requested wheel torque Tw0) corresponding to the drive request of the driver. However, since the compensation component for the requested wheel torque Tw0 substantially assumes a significant value only when the driver operates the pedal, it generally has substantially no influence on occurrence of nose-down behavior that occurs during steering operation. However, the control gain adjusting unit C8 is advantageously located at the position indicated in FIG. 2B, so as to surely reduce the effect of the vibration damping control during steering operation.

What is claimed is:

1. A vibration damping control device that controls drive output of a vehicle so as to suppress pitch/bounce vibration caused by pitch or bounce of the vehicle, comprising:
a vibration damping control unit configured to:
control driving torque of the vehicle so as to reduce an amplitude of the pitch/bounce vibration, based on wheel torque applied to wheels of the vehicle, the wheel torque being generated at a location where the wheels contact with a road surface and configured to reduce an amplitude of a compensation component that corrects the wheel torque so as to suppress the pitch/bounce vibration, as a magnitude of a steering angle velocity of the vehicle increases; and
calculate the compensation component by multiplying the compensation component by a control gain to reduce the amplitude of the pitch/bounce vibration based on the wheel torque,
wherein the control gain of the compensation component decreases as the magnitude of the steering angle velocity of the vehicle increases.

2. The vibration damping control device according to claim 1, wherein the vibration damping control unit makes a rate of reduction of the amplitude of the compensation component relative to the amplitude of the pitch/bounce vibration constant when the magnitude of the steering angle velocity of the vehicle exceeds a predetermined velocity.

3. The vibration damping control device according to claim 1, wherein:
a control gain of the compensation component is a function of the magnitude of the steering angle velocity; and the vibration damping control unit sets the control gain of the compensation component such that the control gain monotonously decreases as the magnitude of the steering angle velocity of the vehicle increases, when the magnitude of the steering angle velocity of the vehicle is smaller than a predetermined velocity.

4. A vibration damping control system comprising:
a drive unit that generates driving force at wheels of a vehicle;
a wheel speed sensor that detects a rotational speed of each of the wheels of the vehicle;
a steering angle sensor that detects a steering angle of a steering wheel of the vehicle; and
an electronic control unit that obtains a first driving force according to an amount of depression of an accelerator pedal, and drives the drive unit with a second driving force that is determined by a compensation component with which the first driving force is corrected so as to suppress pitch/bounce vibration of the vehicle, based on the first driving force and the rotational speed, wherein
the electronic control unit is configured to:
reduce an amplitude of the compensation component as a magnitude of a steering angle velocity obtained from the steering angle increases; and
calculate the compensation component by multiplying the compensation component by a control gain to reduce an amplitude of the pitch/bounce vibration based on the wheel torque,
wherein a control gain of the compensation component, which is a function of the magnitude of the steering angle velocity, decreases as the magnitude of the steering angle velocity of the vehicle increases.

* * * * *